United States Patent Office 2,794,028
Patented May 28, 1957

2,794,028
EPOXY DERIVATIVES

Benjamin Phillips and Paul S. Starcher, Charleston, W. Va., assignors to Union Carbide and Carbon Corporation, a corporation of New York No Drawing. Application August 13, 1953, Serial No. 374,141

3 Claims. (Cl. 260—348)

This invention relates to new organic compounds and has for an object the provision of new types of organic compounds suitable for use in the plastics and resins industry, as well as other important industrial uses. More particularly, this invention relates to epoxy compounds prepared from tetrahydrophthalic anhydride and tetrahydrophthalic acid.

The new compounds of this invention are useful as modifiers for various condensation resins and as plasticizers and stabilizers for various synthetic resins.

The epoxides obtained by the epoxidation of the tetrahydrophthalic acid and its derivatives are particularly attractive, in view of the fact that they are potentially low cost chemicals since the tetrahydrophthalic anhydride is readily obtained by the reaction of butadiene and maleic anhydride, both of which are commercially available in large quantities.

More specifically, the compounds which comprise this invention are useful as chemical intermediates in preparing a large number of chemical compounds by virtue of their reactive epoxide group which can be reacted with a large number of compounds having a labile hydrogen atom.

The compounds of this invention may be conveniently illustrated by the following structural formula:

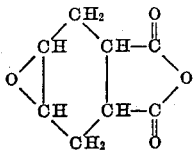

and

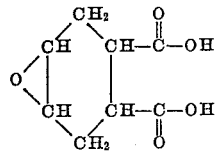

The compounds of this invention are produced by the oxidation of the olefinic linkage contained in the starting material, as in the oxidation of the tetrahydrophthalic anhydride to yield the 4,5-epoxycyclohexane-1,2-dicarboxylic anhydride otherwise known as 7-oxabicyclo-[4.1.0]heptane-3,4-dicarboxylic anhydride.

The oxidizing agents employed in the production of these new compounds are the peracids, such as, for example, peracetic acid, perpropionic acid, perbenzoic acid and the like. More particularly, peracetic acid is employed as the oxidizing agent to produce these epoxy compounds.

The use of the peracids to obtain certain beneficial oxidation results is not new in the art of oxidizing organic compounds. In fact, the history of the peracids dates back to the work of Baeyer and Villiger, who, in 1900, were able to prepare perbenzoic acid by the saponification of dibenzoyl peroxide. The tremendous interest displayed over the peracids is due to the fact that the peracids occupy somewhat a unique position as oxidizing agents. The peracids have the ability to effect several specific chemical transformations with very high efficiencies, whereas, other well known oxidizing agents, such as, for example potassium permanganate, have no such ability.

Among the most interesting types of chemical transformations peculiar to the peracids is that type of reaction which makes available the compounds of this invention, that is, the oxidation of unsaturated organic compounds to yield the corresponding epoxides. It is this particular oxidation ability of the peracids that makes available a host of chemical compounds that may have previously been produced only through laborious and tedious means and in minute quantities or were never heretofore obtainable.

For purposes of illustration, the reaction whereby the epoxide derivative of tetrahydrophthalic anhydride is produced in accordance with our invention, may be written as follows:

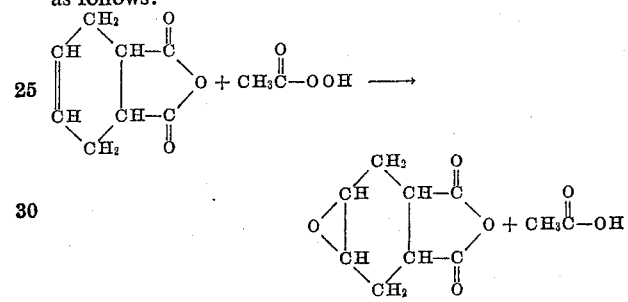

The following examples will serve to illustrate the practice of the invention:

EXAMPLE I

*Preparation of 7-oxabicyclo[4.1.0]heptane-3,4-dicarboxylic acid*

Fifty grams of tetrahydrophthalic acid was dissolved in 150 grams of acetone and the mixture was heated to 40° C. To this mixture was added 132 grams of a 25.4% solution of peracetic acid in acetone over a period of 40 minutes. The reaction mixture was heated at 40° C. for an additional six hours. To 100 grams of this reaction mixture was added enough petroleum ether to cause layer separation. The lower layer was recovered and titrated with petroleum ether until crystallization occurred. The crystals, after being washed with petroleum ether and dried weighed 11.1 grams. An analysis for eopxide content by the hydrogen bromide method indicated a purity of 64.2% calculated as 7-oxabicyclo-[4.1.0]heptane-3,4-dicarboxylic acid.

The rest of the original reaction mixture was placed in a brine bath at —50° C. for eight days. The crystalline phase which separated, was filtered off, washed several times with petroleum ether, and dried. It weighed 7 grams. An analysis for epoxide groups by the hydrogen bromide method indicated a purity of 75.5% calculated as the epoxy acid. Titration of the acid groups followed by saponification, indicated that 82% of the theoretical carboxyl groups were still available. The product melted with foaming at 145°–150° C.

EXAMPLE II

*Preparation of 7-oxabicyclo[4.1.0]heptane-3,4-dicarboxylic anhydride*

One mol of tetrahydrophthalic anhydride was dissolved in 900 grams of ethylbenzene. One and one-half mols of a 23.4% peracetic acid solution in ethyl acetate was added to the anhydride solution over a period of two hours at a temperature of approximately 30° C. The reaction mixture was allowed to stand over night. White crystals of the reaction product was separated from the solution. This crude product had a melting point in the range 141°–143° C. and upon further purification, by two recrystallizations from dioxane, gave 7-oxabicyclo[4.1.0]-heptane-3,4-dicarboxylic anhydride having the following properties:

| Physical Property | Found | Theory |
|---|---|---|
| Melting point ° C | 198 | |
| Neutral equivalent | 85.3 | 84. |
| Epoxide analysis, percent | 98.3 | epoxyanhydride. |
| Percent Carbon | 56.7 | 57.1. |
| Percent Hydrogen | 4.9 | 4.76. |

What is claimed is:

1. An epoxide selected from the group consisting of 4,5 - epoxycyclohexane - 1,2 - dicarboxylic acid and 4,5-epoxycyclohexane-1,2-dicarboxylic anhydride.

2. As a new epoxide, 4,5-epoxycyclohexane-1,2-dicarboxylic acid.

3. As a new epoxide, 4,5-epoxycyclohexane-1,2-dicarboxylic anhydride.

References Cited in the file of this patent

UNITED STATES PATENTS 2,550,494    Olin _____ Apr. 24, 1951
2,570,029    Fluchaire _____ Oct. 2, 1951

OTHER REFERENCES

Ziegler et al.: Annalen, vol. 551, pp. 17–18 (1942).
Gill: J. Chem. Soc., 1952: 4630–4632.